US011117471B2

(12) United States Patent
Huang et al.

(10) Patent No.: US 11,117,471 B2
(45) Date of Patent: Sep. 14, 2021

(54) SYSTEM AND METHOD FOR COLLISION PREVENTION IN A LINEAR MOTION SYSTEM

(71) Applicant: Rockwell Automation Technologies, Inc., Mayfield Heights, OH (US)

(72) Inventors: Yuhong Huang, Acton, MA (US); Brian M. Perreault, Stow, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 251 days.

(21) Appl. No.: 16/206,473

(22) Filed: Nov. 30, 2018

(65) Prior Publication Data
US 2020/0171953 A1    Jun. 4, 2020

(51) Int. Cl.
*B60L 3/00* (2019.01)
*B60L 15/38* (2006.01)
*B60L 15/00* (2006.01)
*B60L 13/03* (2006.01)

(52) U.S. Cl.
CPC ............ *B60L 3/0015* (2013.01); *B60L 15/005* (2013.01); *B60L 15/38* (2013.01); *B60L 13/03* (2013.01)

(58) Field of Classification Search
None
See application file for complete search history.

(56) References Cited

U.S. PATENT DOCUMENTS

| 7,448,327 | B2 | 11/2008 | Thornton et al. | |
|---|---|---|---|---|
| 8,863,669 | B2 | 10/2014 | Young et al. | |
| 9,346,371 | B2 | 5/2016 | King et al. | |
| 2008/0006172 | A1 | 1/2008 | Thornton | |
| 2012/0296562 | A1* | 11/2012 | Carlson | ................. G08G 1/161 701/301 |
| 2015/0360581 | A1 | 12/2015 | King et al. | |
| 2017/0217460 | A1* | 8/2017 | Huber | ................... B61L 25/021 |
| 2018/0074086 | A1* | 3/2018 | Moore | ............... G05B 19/4189 |
| 2019/0084781 | A1* | 3/2019 | Huang | ................... B60L 15/38 |

* cited by examiner

*Primary Examiner* — Truc M Do
(74) *Attorney, Agent, or Firm* — Boyle Fredrickson, SC

(57) ABSTRACT

An improved system for preventing collisions between movers while improving throughput in a linear drive system utilizes a continually variable vehicle length for each mover. A vehicle length is assigned to each mover, where the vehicle length is a minimum track length required by the vehicle to avoid physically contacting a neighboring vehicle along the track. The vehicle length for each mover is then determined for each location along the track based on both the track geometry and the mover geometry. The vehicle length is continually variable along the length of the track allowing movers to be positioned as close together as possible for each location along the track based on both the track geometry and the mover geometry. The continually variable vehicle length provides collision prevention between movers while increasing throughput of movers along segments of the track that do not require the largest spacing between movers.

14 Claims, 11 Drawing Sheets

SYSTEM AND METHOD FOR COLLISION PREVENTION IN A LINEAR MOTION SYSTEM

BACKGROUND INFORMATION

The present invention relates to motion control systems and, more specifically, to providing collision prevention between movers while increasing throughput in a linear drive system.

Motion control systems utilizing movers and linear drives can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

One important task in a linear drive system is to prevent collisions between movers. If a first mover stops on the track, each mover following along the same track must similarly stop to avoid colliding with the first mover. If movers could be brought to stop in tandem in a controlled manner, there would be no need for space between movers, and each mover could operate directly adjacent to the next mover. However, attempting to operate movers in tandem with no space between adjacent movers fails to account for fault conditions. Under a fault condition, the first mover may encounter an obstacle, experience a failure, or experience some other operating condition that may bring the first mover to an unexpected and/or abrupt stop. Under such a fault condition, the first mover may experience damage, but it would be desirable to avoid damage to any additional movers as a result of collisions between movers following the first mover.

Historically, it has been known to define a minimum braking distance for each mover. The minimum braking distance for each mover is defined by the speed at which a mover is operating and the maximum deceleration rate allowed for the mover. Based on the speed of operation and the maximum rate at which the mover is allowed to decelerate, the controller can determine the minimum braking distance required for a mover to come to a stop. If each mover is kept separated from another mover by the minimum braking distance during operation, each mover following the first mover can be brought to a stop before colliding with the first mover in the event the first mover comes to an abrupt and/or unexpected stop.

Maintaining a minimum spacing between movers equal to or greater than the minimum braking distance may provide acceptable collision prevention along straight track segments. However, as a mover travels around a curve, two adjacent movers spaced apart by the minimum braking distance may collide due to the track geometry. If, for example, the track includes a ninety-degree bend, a first mover needs to travel around the bend and the trailing edge of the first mover must clear the bend prior to the leading edge of the second mover entering the bend. If the first mover has not cleared the bend, the corners of the two movers will collide. In order to prevent collisions at a curve, the arc length of the curve is determined and the minimum spacing between movers is set to the arc length. This minimum spacing prevents a second mover from entering a curve before a first mover has exited the curve.

Setting the minimum spacing equal to the arc length of a curve is not without its drawbacks. Different curves have different arc lengths and may result in different desired minimum spacing between movers. Additionally, if a second curve follows a first curve, consideration for the combination of turns as well as the geometry of the mover may require additional spacing between movers to avoid collision. In order to prevent collisions along the entire length of the track, the point along the track requiring the largest minimum spacing between movers is identified and the minimum spacing between movers is set to this largest minimum spacing. While this minimum spacing will prevent collisions along the track, it results in a minimum spacing between movers along certain stretches, such as a straight segment, that is greater than necessary to prevent collisions. This spacing results in a lower throughput of movers in the system which translates to reduced productivity in the system.

Thus, it would be desirable to provide an improved system for preventing collisions between movers while improving throughput in a linear drive system.

BRIEF DESCRIPTION

The subject matter disclosed herein describes an improved system for preventing collisions between movers while improving throughput in a linear drive system. A vehicle length is assigned to each mover, where the vehicle length is a minimum track length required by the vehicle to avoid physically contacting a neighboring vehicle along the track. The vehicle length for each mover is then determined for each location along the track based on both the track geometry and the mover geometry. This vehicle length may be predetermined and stored in a lookup table. Optionally, the vehicle length may be determined by a controller for each mover as the mover travels along the track. The vehicle length is continually variable along the length of the track allowing movers to be positioned as close together as possible for each location along the track based on both the track geometry and the mover geometry. The continually variable vehicle length provides collision prevention between movers while increasing vehicle density along the track. Increased vehicle density may permit a reduced footprint for a track to perform the same tasks, allow the same tasks to be performed on a greater number of payloads within the same footprint for a track, or other benefits resulting from increased throughput of movers along segments of the track that do not require the largest spacing between movers.

According to one embodiment of the invention, a system for preventing collisions in a linear drive system is disclosed. The system includes a track having multiple track segments and multiple movers operative to travel along the track. A position feedback system is operative to generate multiple position feedback signals, where each position feedback signal corresponds to a location of one of the movers along the track. The system also includes a controller operative to receive the position feedback signals and to determine a vehicle length for each of the movers as a function of the location along the track at which the mover is located, where the vehicle length varies for each of the movers as the mover travels along the track. The controller determines a first position and a second position. The first position corresponds to a location of a first mover along the track as determined from the position feedback signals, and the second position corresponds to a location of a second mover as determined from the position feedback signals. The controller stops travel of the second mover when a distance along the track between the second position and the first position is less than or equal to the sum of the vehicle length for the first mover and the vehicle length for the second mover.

According to another embodiment of the invention, a method for preventing collisions in a linear drive system is disclosed. The linear drive system includes a track having multiple track segments and multiple movers operative to travel along the track. Multiple position feedback signals are received at a controller from a position feedback system, where each of the position feedback signals corresponds to a location of one of the movers along the track. A vehicle length is determined for each of the movers with the controller as a function of the location along the track at which the mover is located. The vehicle length varies for each of the movers as the mover travels along the track. A first and a second position are determined, where the first position corresponds to a location of a first mover along the track and the second position corresponds to a location of a second mover along the track. Each of the first and second positions are determined by the controller as a function of the position feedback signals. Travel of the second mover is stopped when a distance along the track between the second position and the first position is less than or equal to the sum of the vehicle length for the first mover and the vehicle length for the second mover.

According to still another embodiment of the invention, a method for preventing collisions in a linear drive system is disclosed. The linear drive system includes a track having multiple track segments and multiple movers operative to travel along the track. Multiple position feedback signals are received at a controller from a position feedback system. Each of the position feedback signals corresponds to a location of one of the movers along the track. A minimum braking distance is determined for each of the movers with the controller as a function of a speed at which the mover is traveling and of a maximum deceleration rate stored within a memory of the controller. A vehicle length is determined for each of the movers with the controller as a function of the location along the track at which the mover is located. The vehicle length varies for each of the movers as the mover travels along the track. First and second positions are determined as a function of the position feedback signals. The first position corresponds to a location of a first mover along the track, and the second position corresponds to a location of a second mover along the track. Operation of the second mover is controlled to remain a minimum distance from the first mover, where the minimum distance is at least as great as the vehicle length for the second mover.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
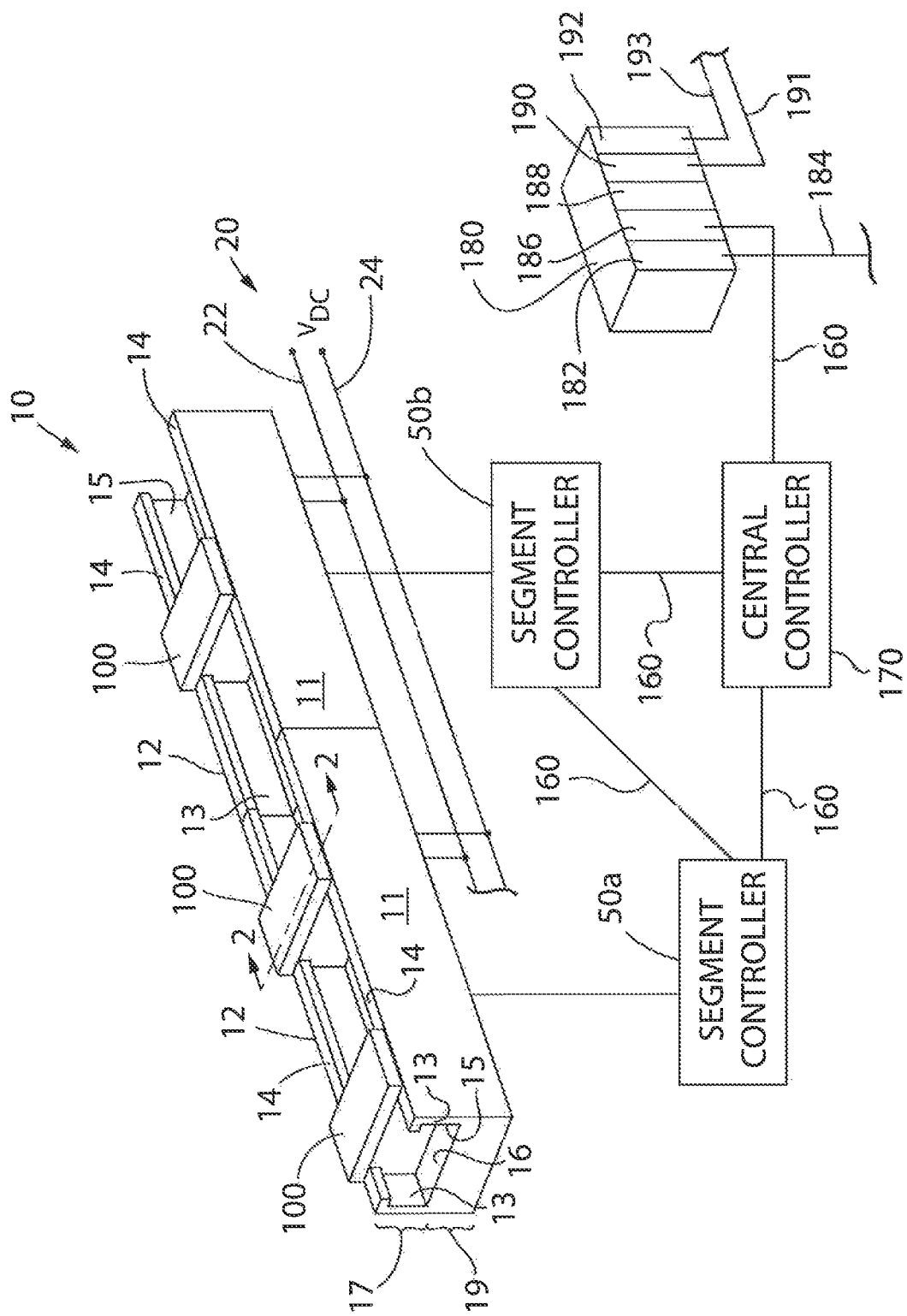
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. Track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing 11 of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

Figure 3:
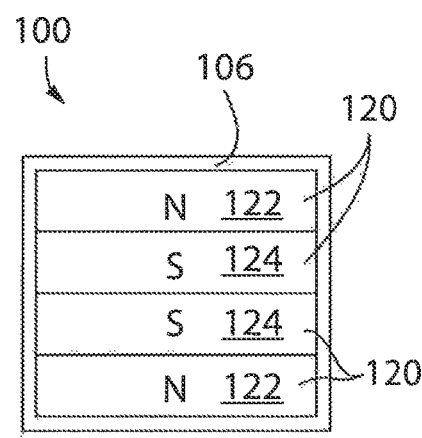
FIG. 3 is a bottom plan view of the exemplary mover of FIG. 2.
Figure 4:
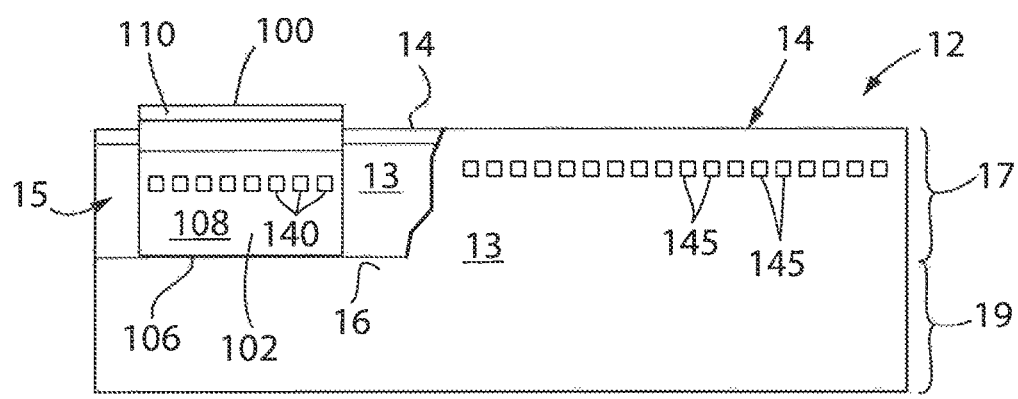
FIG. 4 is a partial side cutaway view of the mover and track segment of FIG. 2.

The mover 100 is carried along the track 10 by a linear drive system. The linear drive system is incorporated in part on each mover 100 and in part within each track segment 12. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. Various other configurations of the drive magnets 120 may be utilized without deviating from the scope of the invention.

Figure 5:
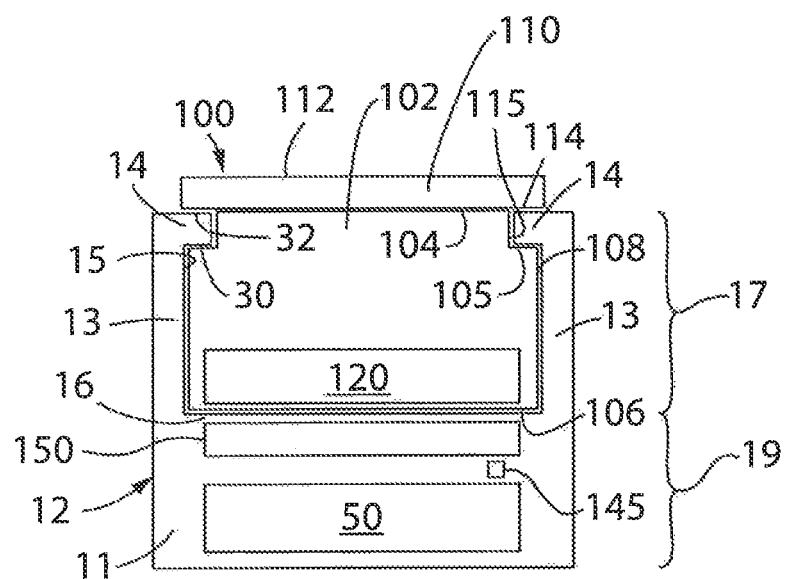
FIG. 5 is a sectional view of another embodiment of a mover and track segment included in the linear drive system taken at 2-2 of FIG. 1.
Figure 7:
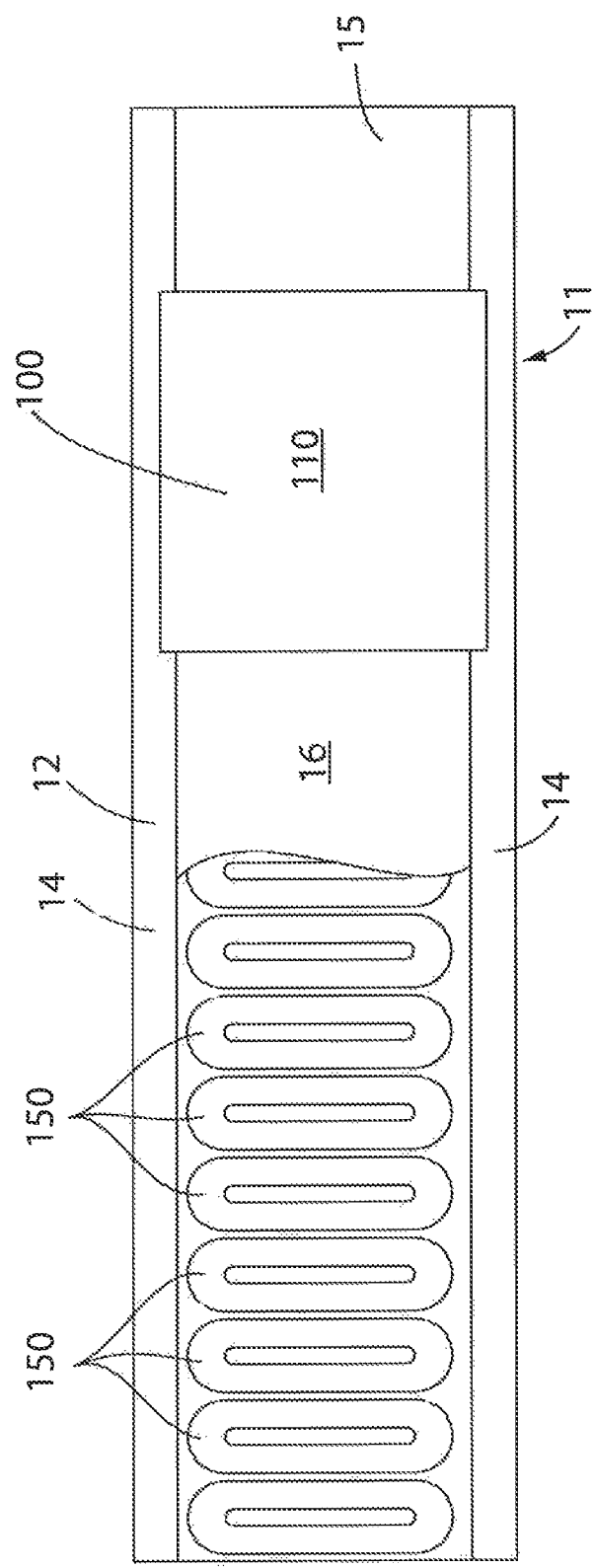
FIG. 7 is a partial top cutaway view of the mover and track segment of FIG. 2.

The linear drive system further includes a series of coils 150 spaced along the length of the track segment 12. With reference also to FIGS. 5 and 7, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

Figure 2:
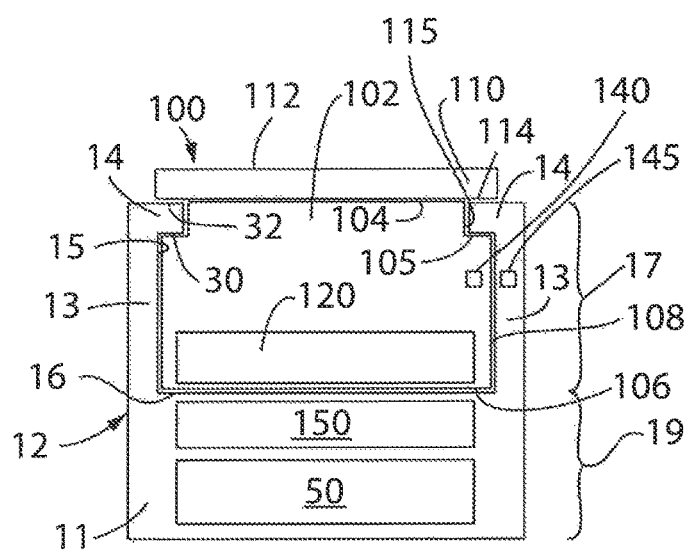
FIG. 2 is a sectional view of one embodiment of a mover and track segment included in the linear drive system taken at 2-2 of FIG. 1.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
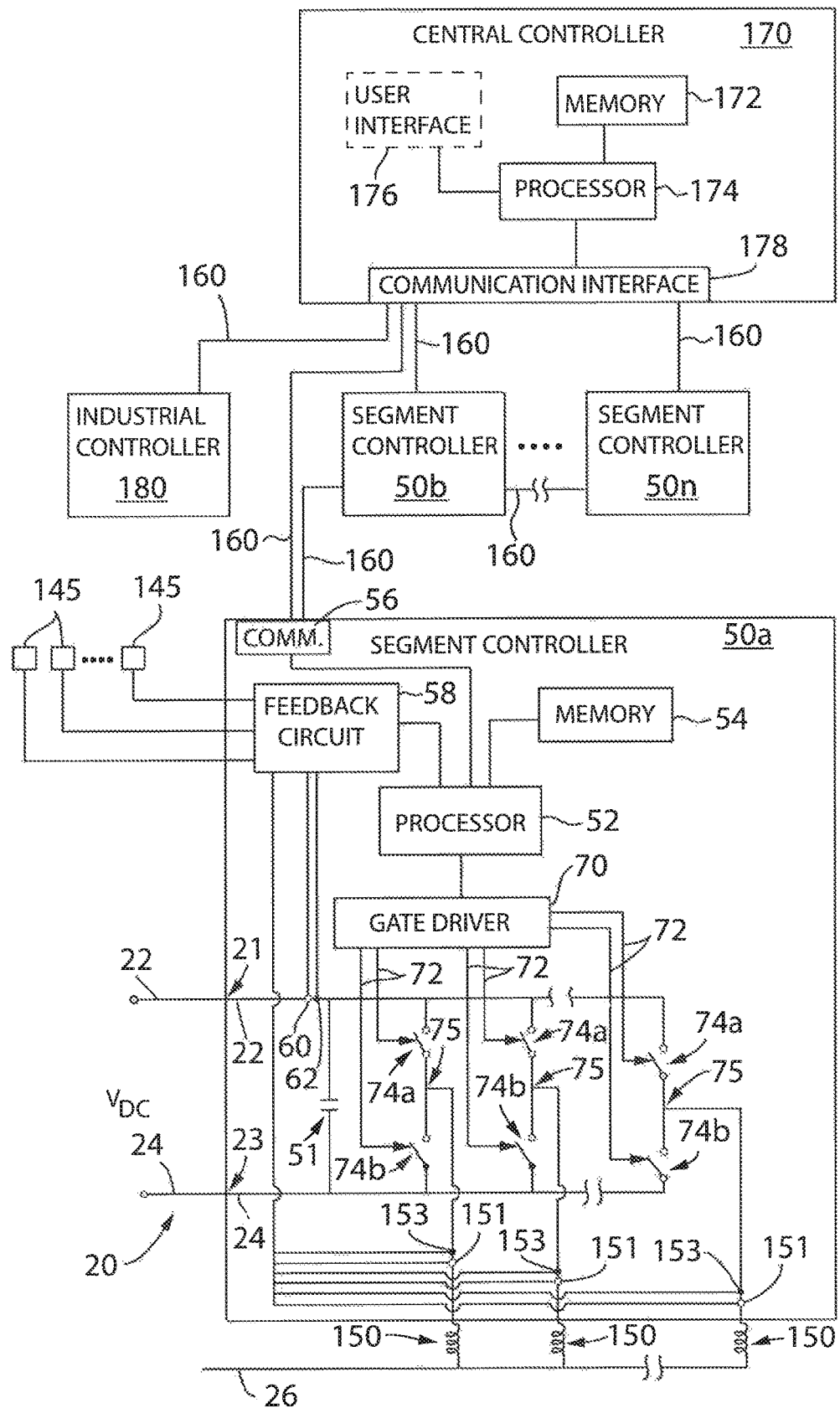
FIG. 8 is a block diagram representation of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 180 and determines one or more motion profiles for the movers 100 to follow along the track 10. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
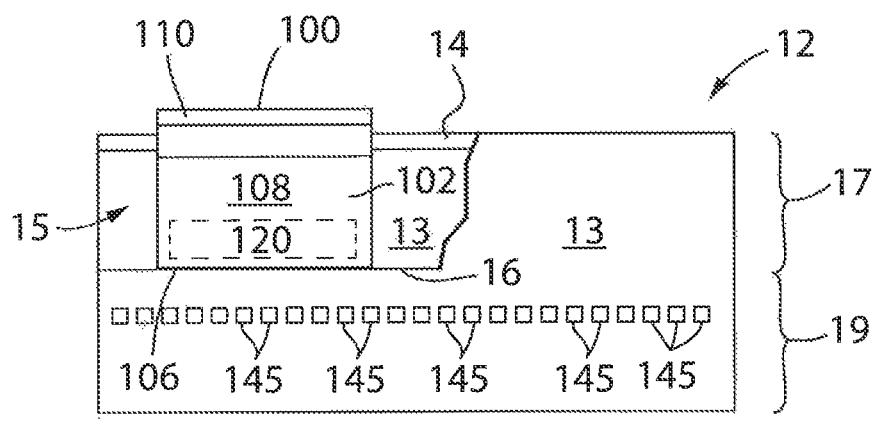
FIG. 6 is a partial side cutaway view of the mover and track segment of FIG. 5.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, $V_{DC}$, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential. According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the illustrated embodiment, three legs are shown. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg 221 may also be referred to herein as an upper switch, and the second switching device 74b in each leg 221 may also be referred to herein as a lower switch. The terms upper and lower are relational only with respect to the schematic representation and are not intended to denote any particular physical relationship between the first and second switching devices 74a, 74b. The switching devices 74 include, fix example, power semiconductor devices such as transistors, thyristors, and silicon controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

Figure 9:
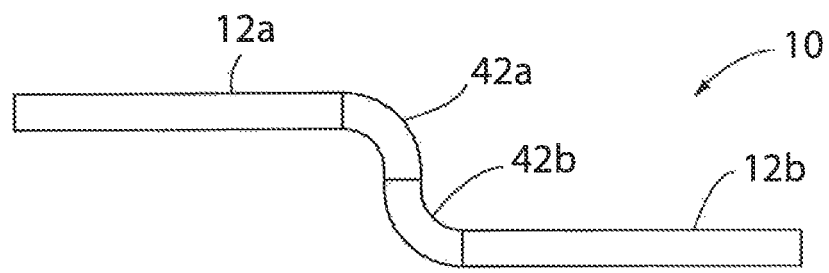
FIG. 9 is top plan view of a partial track layout.
Figure 13:
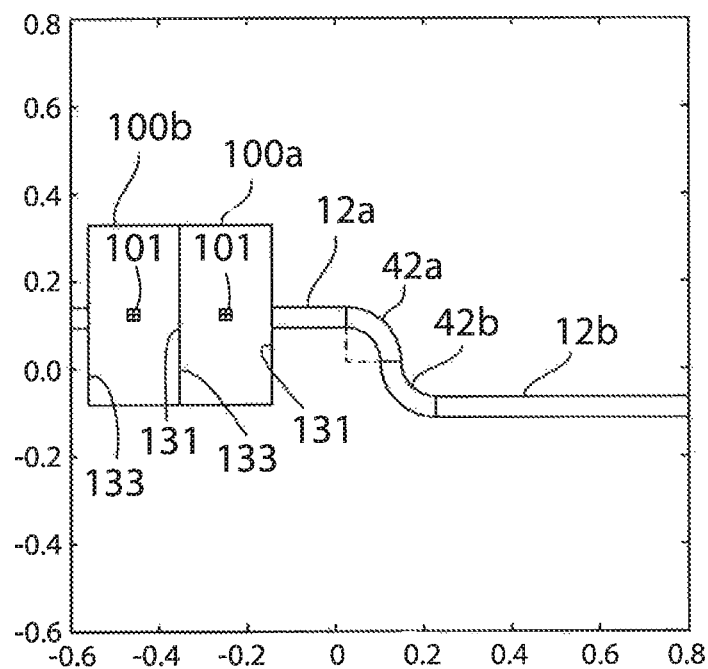
FIG. 13 is a top plan view of the partial track layout of FIG. 9 with two movers having a first geometry positioned along a straight segment of the track.
Figure 14:
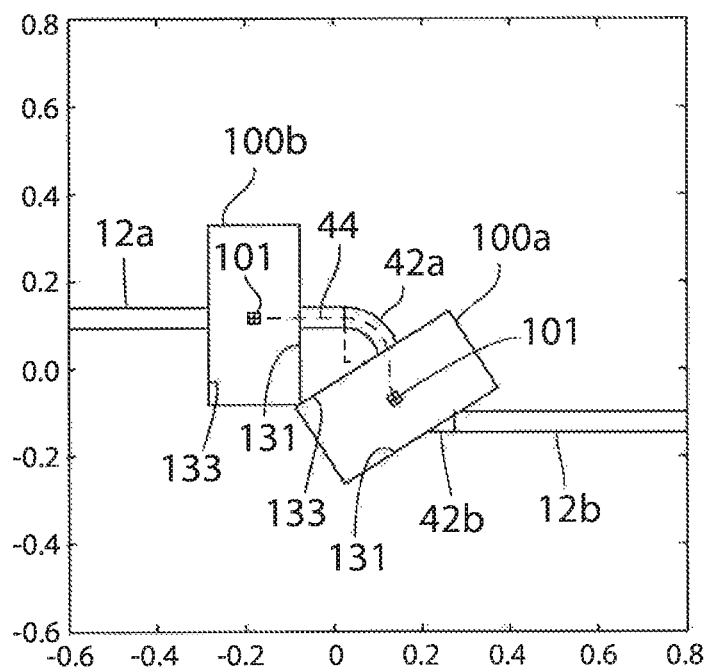
FIG. 14 is a top plan view of the partial track layout of FIG. 9 with two movers having a first geometry positioned at a curved segment of the track.

In operation, the segment controller 50 on each track segment 12 is configured to control operation of each mover 100 and to prevent collisions between movers 100 present on the track segment 12. The segment controller 50 utilizes knowledge of the geometry of the track 10 and of each mover 100 in collision prevention. With reference, for example, to FIG. 9, a portion of the track 10 may include two straight track segments 12 and two curved track segments 42. The portion of the track 10 shown in FIG. 9 will be discussed with respect to two different mover geometries as illustrated in FIGS. 13-14 and in FIGS. 16-17. The illustrated embodiments are exemplary and are not intended to be limiting. The first straight track segment 12a has a first end, a second end, and extends for a length of one meter. The first curved track segment 42a has a first end, a second end, forms a ninety-degree bend, and has a track length of about one-tenth of a meter extending along the arc formed by the curved track segment. The first end of the first curved segment 42a is connected to the second end of the first straight track segment 12a, and the second end of the first curved segment 42a is connected to a first end of a second curved track segment 42b. The second curved track segment 42b has a first end, a second end, forms a ninety-degree bend, and also extends for a length of about one-tenth of a meter extending along the arc formed by the curved track segment. The second end of the second curved track segment 42b is connected to a first end of a second straight track segment 42b. The second straight track segment 12b has a first end, a second end, and extends for a length of one meter. The combination of the four track segments (12a, 42a, 42b, 12b) form a continuous path over which movers 100 may travel.

Figure 16:
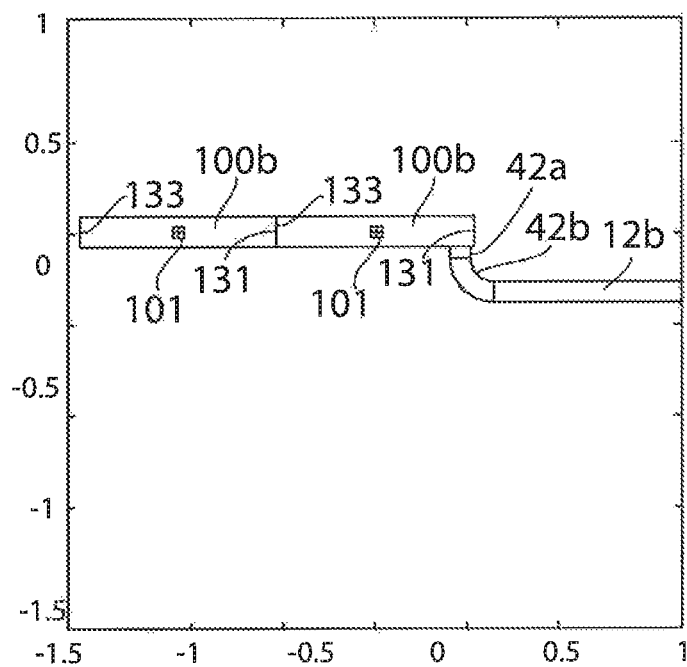
FIG. 16 is a top plan view of the partial track layout of FIG. 9 with two movers having a second geometry positioned along a straight segment of the track.
Figure 17:
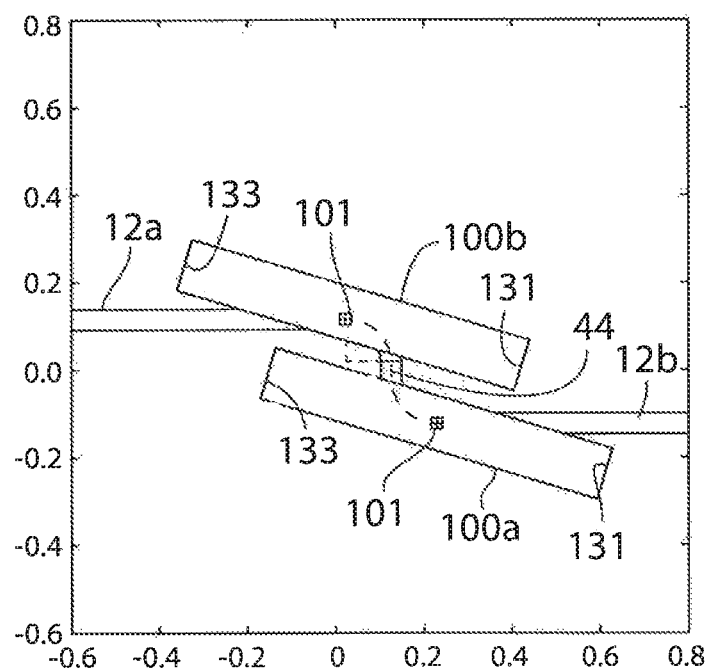
FIG. 17 is a top plan view of the partial track layout of FIG. 9 with two movers having a second geometry positioned at a curved segment of the track.

With reference next to FIGS. 13, 14, 16, and 17, movers 100 having different geometries are illustrated in different locations along the portion of track 10 shown in FIG. 9. Movers 100 having a first geometry are illustrated in FIGS. 13 and 14. According to the illustrated embodiment, the movers 100 shown in FIGS. 13 and 14 may be two hundred five millimeters (205 mm) long, where length is defined in a direction extending longitudinally along the track, 10 and four hundred fifteen millimeters (415 mm) wide, where width is defined in a direction extending transverse to the track 10. Movers 100 having a second geometry are illustrated in FIGS. 16 and 17. According to the illustrated embodiment, the movers 100 shown in FIGS. 16 and 17 may be eight hundred millimeters (800 mm) long, where length is defined in a direction extending longitudinally along the track, 10 and one hundred twenty millimeters (120 mm) wide, where width is defined in a direction extending transverse to the track 10.

As shown in the exemplary embodiments, movers 100 having different geometries require different spacing as the movers travel along the track. Looking first at FIG. 13, two movers having the first geometry are shown traveling along a straight track segment 12. In the illustrated example, the movers 100a, 100b are traveling from left to right with a first mover 100a in front of a second mover 100b. FIG. 13 illustrates a minimum spacing required between the two movers 100a, 100b to avoid physical contact between the movers. Because each mover 100a, 100b is rectangular in shape, the minimum spacing between movers provides for one edge of one mover being positioned adjacent to one edge of the other mover. As shown, a leading edge 131 of the second mover 100b is directly adjacent to a trailing edge 133 of the first mover 100a. As the movers 100a, 100b approach the curved segments 42, a center point 101 of the first mover 100a travels along the track segment 42. The upper portion (with respect to the illustration) of the mover 100a rotates right and the lower portion (with respect to the illustration) of the mover 100b rotates left. At the junction between the two curved segments 42, the first mover 100a is perpendicular to the second mover 100b. As the first mover 100a continues traveling along the second curved segment 42, the left side (with respect to the illustration) of the mover 100 begins to rotate back to a downward position and the right side (with respect to the illustration) of the mover 100 begins to rotate back to an upward position. The position shown in FIG. 14 shows the first mover 100a having traveled partially along the second curved segment 42. At the positions shown in FIG. 14, the left, lower corner of the first mover 100a is the last point of the first mover 100a to clear the curved segments and is shown adjacent to the right, lower corner of the second mover 100b. The minimum spacing required along the track 10 between the two movers to avoid physical contact between the movers is the length of the arc 44. Clearly, the minimum spacing required between the two movers 100a, 100b to avoid collision is greater as the movers travel along the curved segments 42 than when the movers travel along the straight segments 12.

Turning next to FIGS. 16 and 17, movers having the second geometry are shown traveling along the same track as that used by the movers having the first geometry. In FIG. 16, the movers 100a, 100b are again traveling from left to right with a first mover 100a in front of a second mover 100b. FIG. 16 illustrates a minimum spacing required between the two movers 100a, 100b to avoid physical contact between the movers. Because each mover 100a, 100b is rectangular in shape, the minimum spacing between movers provides for one edge of one mover being positioned adjacent to one edge of the other mover. As shown, a leading edge 131 of the second mover 100b is directly adjacent to a trailing edge 133 of the first mover 100a. As the movers 100a, 100b approach the curved segments 42, a center point 101 of the first mover 100a travels along the track segment 42. The right portion (with respect to the illustration) of the mover 100a rotates downward and the left portion (with respect to the illustration) of the mover 100b rotates upward. At the junction between the two curved segments 42, the first mover 100a is perpendicular to the second mover 100b. As the first mover 100a continues traveling along the second curved segment 42, the top side (with respect to the illustration) of the mover 100 begins to rotate back toward the left and the lower side (with respect to the illustration) of the mover 100 begins to rotate back to the right. The position shown in FIG. 17 shows the first mover 100a having traveled partially along the second curved segment 42 and the second mover 100a having traveled partially along the first curved segment 42. Unlike the first geometry, discussed above, which required the second mover 100b to stop a short distance in front of the first curved segment 42a, the second mover 100b according to the second geometry may enter the first curved segment 42a while the first mover 100a is traveling along the second curved segment 42b. The minimum spacing required along the track 10 between the center points 101 of the two movers to avoid physical contact between the movers is the length of the arc 44. When compared to FIG. 16, the distance between the center points 101 of the two movers 100a, 100b is less in FIG. 17 than in FIG. 14.

As demonstrated in the embodiments discussed above, the minimum distance required between movers 100 to avoid a collision between movers 100 varies as a function of the geometry of the mover 100 and as a function of the geometry of the track 10. In order to account for the varying geometries, the present invention defines a vehicle length for each mover 100 as a distance between a center point 101 of the mover 100 and another point along the track, which defines the minimum separation between adjacent movers 100 to prevent a collision between adjacent movers.

Figure 11:
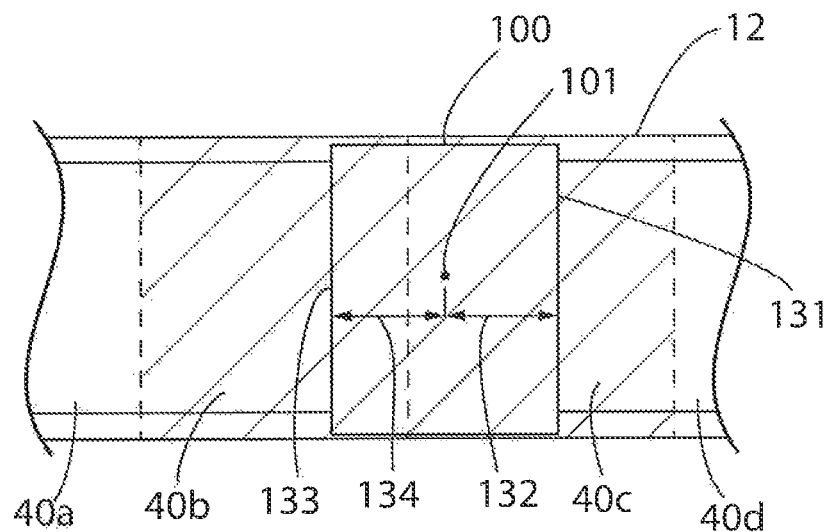
FIG. 11 is a top plan view of one mover on a track segment illustrating one embodiment of vehicle lengths for the mover.

With reference first to FIG. 11, an exemplary mover 100 is illustrated with a first vehicle length 132 defined toward the front of the mover and a second vehicle length 134 defined to the rear of the mover. According to the illustrated embodiment, the first vehicle length 132 is equal to the second vehicle length 134. As further shown in the exemplary embodiment of FIG. 11, the first vehicle length 132 corresponds to a distance between the center point 101 and the leading edge 131 of the mover 100. The second vehicle length 134 corresponds to a distance between the center point 101 and the trailing edge 133 of the mover 100. The first and second vehicle lengths 132, 134 correspond to the examples illustrated in FIGS. 13 and 16 in which each mover 100 must be spaced out at least the length of the mover 100 along the track in order to avoid colliding with an adjacent mover 100.

Figure 12:
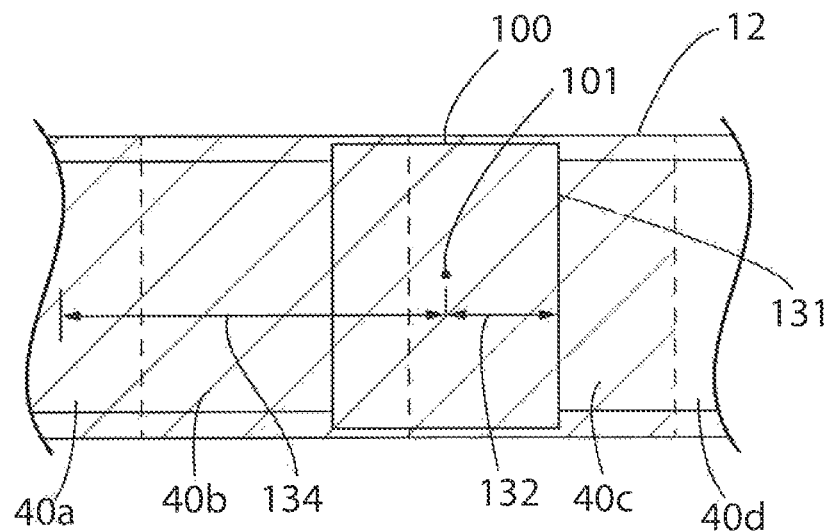
FIG. 12 is a top plan view of one mover on a track segment illustrating another embodiment of vehicle lengths for the mover.

With reference next to FIG. 12, the exemplary mover 100 of FIG. 11 is again illustrated with a first vehicle length 132 defined toward the front of the mover and a second vehicle length 134 defined to the rear of the mover. The first vehicle length 132 again corresponds to a distance between the center point 101 and the leading edge 131 of the mover 100. The second vehicle length 134, however, corresponds to a distance between the center point 101 and extends beyond the trailing edge 133 of the mover 100 for an additional distance along the track 10. The additional distance may correspond, for example, to the arc length 44 of FIG. 14 between the first mover 100a and the second mover 100b. The additional vehicle length 134 to the rear of the first mover 100a indicates that there is additional space required between the first mover 100a and the second mover 100b along the curved segments 42 to avoid collision between the movers.

Although illustrated with a first vehicle length 132 and a second vehicle length 134 defined for each mover 100 in FIGS. 11-12, it is contemplated that a single vehicle length may be defined for each mover 100. The single vehicle length may be set to a greater of two values for the distance required toward the front of the mover 100 or the distance required toward the rear of the mover 100 to avoid collision with an adjacent mover. According to still another embodiment, the reference point from which the vehicle length is determined may be set to the leading edge 131 or the trailing edge 133 of the mover 100 and the single vehicle length corresponds to the entire distance across the mover 100 and/or any additional distance along the track 10 required to avoid colliding with an adjacent mover.

Figure 10:
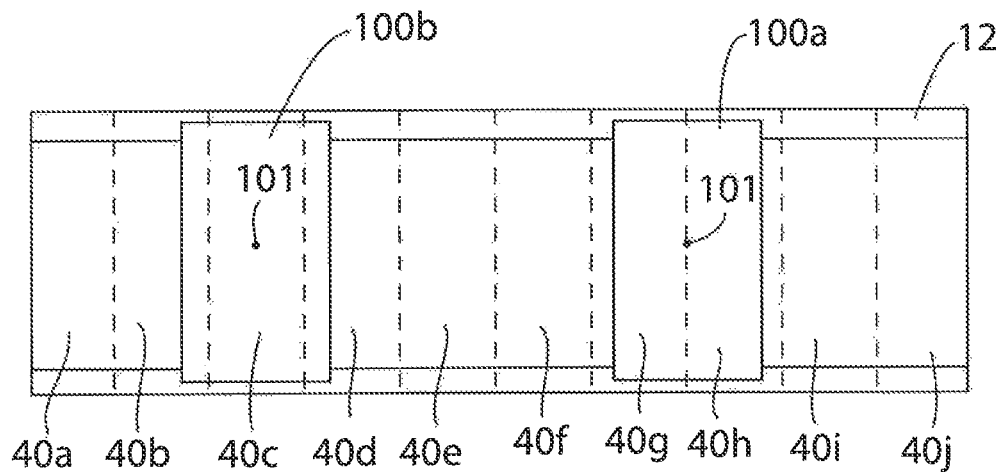
FIG. 10 is a top plan view of a track segment illustrating division of the track segment into blocks.

With reference also to FIG. 10, it is contemplated that each track segment 12 may be divided into blocks 40. According to the illustrated embodiment, one track segment 12 has been divided into ten (10) blocks 40a-40j. The first mover 100a is positioned, at least in part, across two blocks (40g, 40h) and the second mover 100b is positioned, at least in part, across three blocks (40b, 40c, 40d). In order to help prevent collisions between movers, the segment controller 50 permits only a single mover 100 to be located within each block 40 of the track segment 12. Thus, the first mover 100a is the only mover allowed to enter blocks 40g and 40h and the second mover 100b is the only mover allowed to enter blocks 40b, 40c, and 40d.

The segment controller 50 on each track segment 12, 42 further uses the vehicle length 132, 134 for each mover 100 in combination with the assignment of blocks 40 to each mover 100 to prevent collisions between adjacent movers 100. Rather than solely limiting assignment of blocks 40 to a mover 100 based on the physical location of each mover 100, as discussed above, the segment controller 50 assigns blocks 40 to a mover 100 according to the vehicle length 132, 134 defined for each mover 100. As previously discussed, the vehicle length 132, 134 may extend only to an edge of the mover 100, but, in certain geometries, the vehicle length 132, 134 may extend beyond the edge of a mover 100 for a distance along the track 10. With reference again to FIG. 11, the mover 100 has a first vehicle length 132 that extends just to the leading edge 131 and a second vehicle length 134 that extends just to a trailing edge 133. The segment controller 50 assigns blocks 40b and 40c to the mover because these two blocks are within the defined vehicle length for the mover 100. With reference, however, to FIG. 12, the mover 100 has a first vehicle length 132 that extends just to the leading edge 132 but a second vehicle length 134 that extends beyond the rear of the mover. In this arrangement, the segment controller assigns blocks 40a, 40b, and 40c to the mover 100 because each of these blocks are within the total defined vehicle length of the mover 100. To prevent collisions, the segment controller 50 prevents each mover 100 from entering a block 40 that is assigned to another mover 100. As a mover 100 travels along the track segment 12, blocks 40 are assigned to and released from each mover as the total vehicle length of the mover 100 enters and exits a region of the track segment 12 assigned to each block. Prior to allowing a mover 100 to enter a block 40 adjacent to one already assigned to the mover, the segment controller 50 verifies that the block 40 is not assigned to another mover 100.

In order to maximize the number of movers 100 that may be present on a track 10 and, thereby, to maximize throughput of the track 10, the vehicle length(s) 132, 134 for each mover 100 is determined for each position along the track 10. In a straight section of the track 10, the vehicle length determination may simply be dividing the length of each mover 100 along the track 10 in half. For example, the movers 100 in FIGS. 13 and 14 may have a vehicle length of one hundred two and one-half millimeters (10.2.5 mm) along a straight segment. Similarly, the movers 100 in FIGS. 16 and 17 may have a vehicle length of four hundred millimeters (400 mm) along a straight segment. For the illustrated embodiments, the vehicle lengths 132, 134 are determined from a center point 101 of each mover 100. The position feedback system provides a single position for each mover 100, corresponding to the center point 101 of the mover 100. Thus, the segment controller 50 prevents each mover 100 from travelling closer than the vehicle length from the center point 101 of the mover 100 to any adjacent mover 100 along the track 10. When the segment controller 50 assigns blocks 40 to a mover 100, the segment controller 50 prevents each mover 100 from travelling closer than the vehicle length from the center point 101 of the mover 100 to any upcoming block 40 that has already been assigned to another mover 100. Thus, blocks 40 located under or behind the first mover 100a up to the distance of the vehicle length 134 to the rear of the first mover 100a remain assigned to the first mover 100a and the second mover 100b is prevented from entering those blocks. A vehicle length 134 equal to one half of the total length of the mover 100 keeps blocks 40 to the rear of the mover assigned to that mover while looking an equal distance to the front of the mover for any blocks owned by an adjacent mover.

Figure 15:
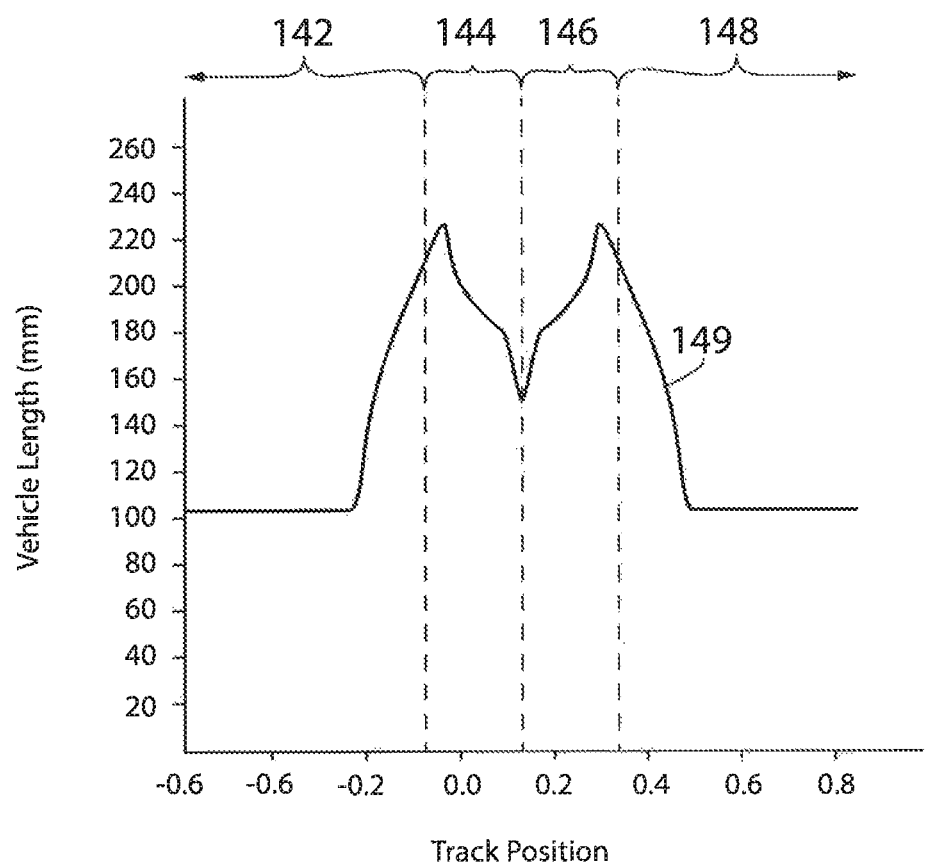
FIG. 15 is a graphical representation of a variable vehicle length for the movers of FIGS. 13 and 14 along the illustrated partial track layout.
Figure 18:
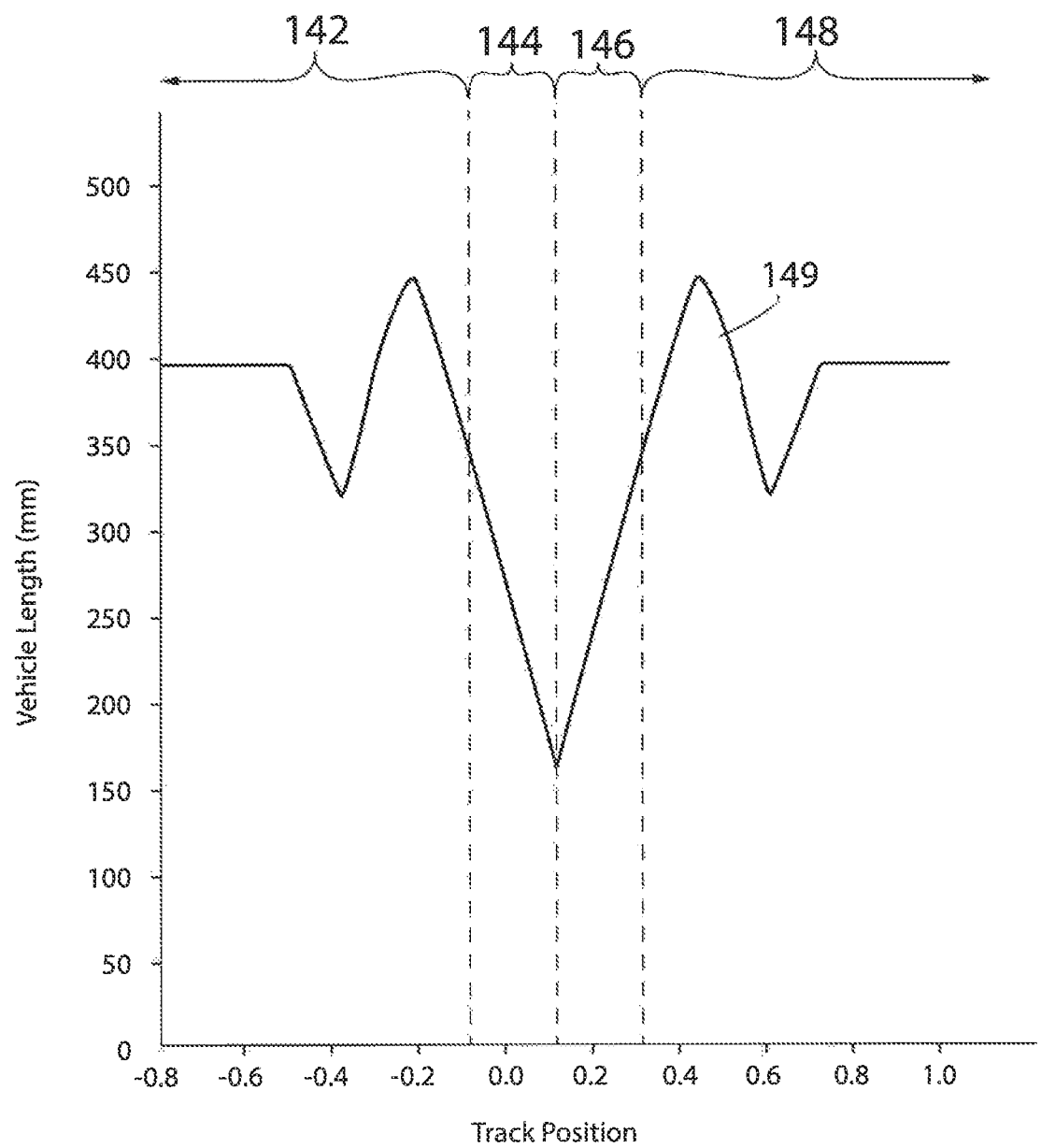
FIG. 18 is a graphical representation of a variable vehicle length for the movers of FIGS. 16 and 17 along the illustrated partial track layout.

As the mover 100 approaches the curved segments 42, the value for the vehicle length 132, 134 assigned to each mover 100 varies. With reference to FIGS. 15 and 18, plots 149 of the vehicle length with respect to the track position are provided. The plot 149 shown in FIG. 15 corresponds to the mover 100 geometry illustrated in FIGS. 13 and 14, and the plot 149 shown in FIG. 18 corresponds to the mover 100 geometry illustrated in FIGS. 16 and 17. In a first portion 142 of each plot 149, the mover 100 is travelling along the first straight segment 12a towards the first curved segment 42a. The dashed lines illustrate junctions along the track between each track segment. At the first dashed line (moving from left to right), the mover 100 transitions from the first straight segment 12a to the first curved segment 42a. At the second dashed line, the mover 100 transitions from the first curved segment 42a to the second curved segment 42b. At the third dashed line, the mover 100 transitions from the second curved segment 42b to the second straight segment 12b.

Each portion (142, 144, 146, 148) of the plot 149 illustrates the minimum vehicle length required at that position along the track 10 to prevent adjacent movers 100 from colliding. With reference to FIG. 15, as the first mover 100a approaches the junction between the first straight segment 12a and the first curved segment 42a, additional space between movers 100 is required to allow the first mover 100a to rotate ninety degrees around the first curve. Consequently, the plot 149 of the vehicle length 132, 134 along the first straight segment 12a begins to increase as the mover 100 approaches the junction. As the first mover 100a continues to travel along the first curved segment 42a the distance required between the movers reaches a maximum and then decreases. The vehicle length 132, 134 for each mover follows the required spacing between movers 100 as shown in the second portion 144 of the plot 149. As the first mover 100a transitions to the second curved segment 42b additional rotation of the mover 100 requires the second mover 100b to wait before entering the curves and the minimum distance required between movers 100 again increases. The vehicle length 132, 134 for each mover follows the required spacing between movers 100 as shown in the third portion 146 of the plot 149. After reaching a maximum vehicle length shortly before transitioning to the second straight segment 12b, the vehicle length begins going back down to the distance required between movers 100 along a straight segment 12 as shown in the fourth portion 148 of the plot 149.

A similar plot in FIG. 18 illustrates the vehicle length required by the movers 100 having the second geometry shown in FIGS. 16 and 17 as the first and second movers 100a, 100b travel along the same track segments. In comparison to the plot 149 illustrated in FIG. 15, the plot 149 illustrated in FIG. 18 demonstrates that vehicle lengths vary differently for each mover as a function of the mover geometry even over identical track geometry.

Determination of the values for the vehicle length 132, 134 with respect to the track position may be performed in advance for a particular track layout and mover geometry or, optionally, may be performed in real-time by each segment controller 50. In a first embodiment, the values for the vehicle length 132, 134 with respect to the track position are determined in advance for the track layout and mover geometry. The values of the vehicle length 132 may be stored in a lookup table in the memory 54 of the segment controller 50 and read from memory as the mover 100 travels along the length of the track segment 100. In a second embodiment, the values for the vehicle length 132, 134 are determined in real-time by the segment controller 50. A description of the mover geometry, such as values for a length and width, are stored in the memory 54 of the segment controller 50. Geometry of the track segment 12 on which the segment controller 50 is located as well as adjacent track segments that may impact the values of the vehicle length are also stored in the memory 54 of the segment controller 50. As the mover 100 travels along the length of the track segment 12, the value of the vehicle length at that position may be determined.

In the first embodiment, the segment controller 50 does not require detailed knowledge of the mover geometry, orientation and/or the geometry of one or more adjacent track sections. However, the first embodiment requires additional setup calculations to determine the vehicle length for each mover 100 as it travels along the length of the track and requires storage within the memory 54 of the segment controller 50 for the look up table. In the second embodiment, the initial calculations and storage are not required; however, the segment controller 50 requires knowledge of the mover geometry, orientation and/or the geometry of one or more adjacent track sections. Less initial information needs to be determined and stored, but the calculations may grow complicated if the mover geometry and/or the track layout grow more complex.

It is further contemplated that a track 10 may include movers 100 having different geometries present along the track 10. A separate lookup table may be generated for each geometry of mover 100 traveling along the track. Similarly, separate mover geometry data may be stored and different calculations performed based on the mover 100 present along the track segment 12.

In the description of vehicle lengths 132, 134 presented above, the vehicle lengths are each determined with respect to an adjacent mover 100 present along the track or to an upcoming block 40, assigned to the adjacent mover 100, and to which a mover will need to travel. While these distances may represent the minimum distance required between movers to avoid physical contact between adjacent movers, it is contemplated that the vehicle lengths 132, 134 are further implemented in combination with a minimum stopping distance. The minimum stopping distance required by a mover 100 as a function of the velocity at which the mover 100 is travelling and as a function of the maximum deceleration rate for the mover 100 is also determined. The minimum stopping distance is added to the vehicle length to determine the minimum spacing required between adjacent movers. Thus, if a second mover 100b is approaching a first mover 100a, or a block 40 assigned to the first mover, and the sum of the minimum stopping distance and the vehicle length is less than or equal to the distance to the first mover 100a, or block 40 assigned to the first mover, the second mover begins to slow down such that the second mover 100b stops prior to colliding with the first mover or entering the block assigned to the first mover.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for preventing collisions in a linear drive system, comprising:
   a track including a plurality of track segments;
   a plurality of movers operative to travel along the track;
   a position feedback system operative to generate a plurality of position feedback signals, wherein each position feedback signal corresponds to a location of one of the plurality of movers along the track;
   a controller operative to:
      receive the plurality of position feedback signals,
      determine a vehicle length for each of the plurality of movers, wherein:
         the vehicle length is a minimum length between the corresponding mover and an adjacent mover to prevent the corresponding mover contacting the adjacent mover,
         the vehicle length varies for each of the plurality of movers as the corresponding mover travels along the track, and
         the vehicle length varies as a function of the location along the track at which the corresponding mover is located and not as a function of a change in a load present on the corresponding mover,
      determine a first position, the first position corresponding to a location of a first mover along the track as determined from the plurality of position feedback signals,
      determine a second position, the second position corresponding to a location of a second mover as determined from the plurality of position feedback signals, and
      stop travel of the second mover when a distance along the track between the second position and the first position is less than or equal to a sum of the vehicle length for the first mover and the vehicle length for the second mover.

2. The system of claim 1 wherein each of the plurality of movers includes a first vehicle length and a second length, the first vehicle length corresponding to a distance along the track in a first direction and the second vehicle length corresponding to a distance along the track in a second direction.

3. The system of claim 1 wherein:
   each of the plurality of track segments includes a segment controller, the segment controller is the controller for the track segment, and
   the segment controller is operative to identify the first mover and the second mover located along the corresponding track segment.

4. The system of claim 3 wherein each segment controller includes a memory device operative to store a lookup table and the lookup table defines the vehicle length for each of the plurality of movers as a function of the location of the mover along the corresponding track segment.

5. The system of claim 3 wherein each segment controller includes a memory device operative to store a geometry of each of the plurality of movers and a geometry of the corresponding track segment and wherein each segment controller is further operative to determine the vehicle length for each of the plurality of movers as a function of the geometry of the mover and of the geometry of the corresponding track segment.

6. The system of claim 3 wherein:
   each track segment is divided into a plurality of blocks along a length of the track segment,
   the segment controller is further operative to:
      assign at least one of the plurality of blocks to each of the plurality of movers located along the corresponding track segment, wherein each of the at least one of the plurality of blocks is assignable to only one of the plurality of movers; and
      stop travel on the second mover when a distance between the second position and one of the plurality of blocks assigned to the first mover is less than or equal to the vehicle length of the second vehicle.

7. The system of claim 6 wherein each of the plurality of blocks within the vehicle length of one of the plurality of movers is assigned to that mover.

8. A method for preventing collisions in a linear drive system, wherein the linear drive system includes a track having a plurality of track segments and a plurality of movers operative to travel along the track, the method comprising the steps of:
   receiving a plurality of position feedback signals at a controller from a position feedback system, wherein each of the plurality of position feedback signals corresponds to a location of one of the plurality of movers along the track;
   determining a vehicle length for each of the plurality of movers with the controller, wherein:
      the vehicle length is a minimum length between the corresponding mover and an adjacent mover to prevent the corresponding mover contacting the adjacent mover,
      the vehicle length varies for each of the plurality of movers as the corresponding mover travels along the track, and
      the vehicle length varies as a function of the location along the track at which the corresponding mover is located and not as a function of a change in a load present on the corresponding mover;
   determining a first position corresponding to a location of a first mover along the track, wherein the first position is determined by the controller as a function of the plurality of position feedback signals;
   determining a second position corresponding to a location of a second mover along the track, wherein the second position is determined by the controller as a function of the plurality of position feedback signals; and
   stopping travel of the second mover when a distance along the track between the second position and the first position is less than or equal to the sum of the vehicle length for the first mover and the vehicle length for the second mover.

9. The method of claim 8 wherein each of the plurality of movers includes a first vehicle length and a second length, the first vehicle length corresponding to a distance along the track in a first direction and the second vehicle length corresponding to a distance along the track in a second direction.

10. The method of claim 8 wherein each of the plurality of track segments includes a segment controller, the segment controller is the controller for the track segment, and the method further comprises the step of identifying the first mover and the second mover located along the corresponding track segment with the segment controller.

11. The method of claim 10 wherein each segment controller includes a memory device operative to store a lookup table and the lookup table defines the vehicle length for each of the plurality of movers as a function of the location of the mover along the corresponding track segment.

12. The method of claim 10 wherein each segment controller includes a memory device operative to store a geometry of each of the plurality of movers and a geometry of the corresponding track segment, the method further comprising the step of determining the vehicle length for each of the plurality of movers with the segment controller as a function of the geometry of the mover and of the geometry of the corresponding track segment.

13. The method of claim 10 wherein each track segment is divided into a plurality of blocks along a length of the track segment, the method further comprising the steps of:
    assigning at least one of the plurality of blocks to each of the plurality of movers located along the corresponding track segment, wherein each of the at least one of the plurality of blocks is assignable to only one of the plurality of movers; and
    stopping travel of the second mover when a distance between the second position and one of the plurality of blocks assigned to the first mover is less than or equal to the vehicle length of the second vehicle.

14. The method of claim 13 wherein each of the plurality of blocks within the vehicle length of one of the plurality of movers is assigned to that mover.

* * * * *